Jan. 8, 1929.

A. S. HOWELL 1,698,333

DIRECT VIEWING PHOTOGRAPHIC CAMERA

Filed Oct. 3, 1924 6 Sheets-Sheet 1

Inventor:-
Albert S. Howell
By:- Miehle & Miehle, Atty's

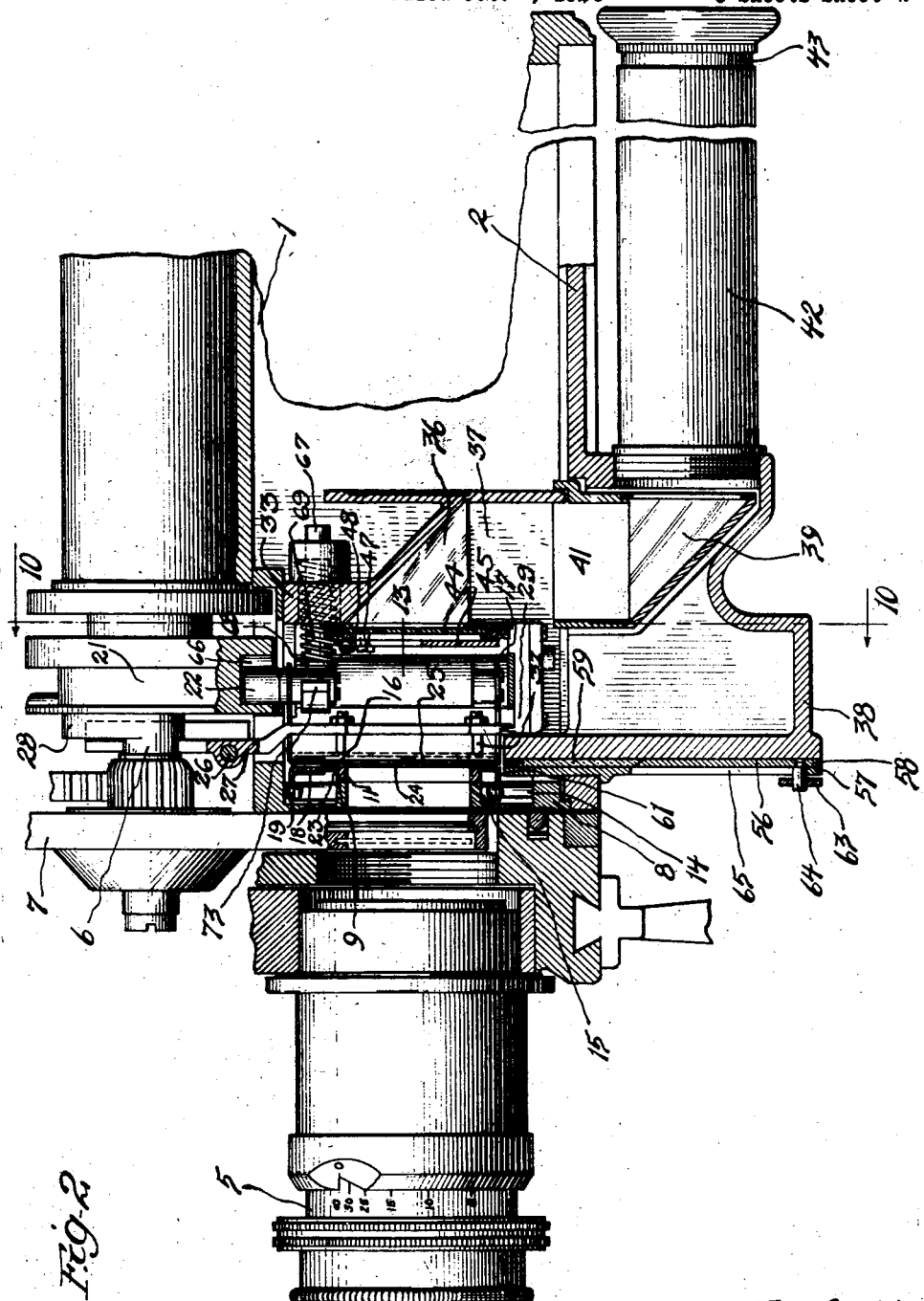

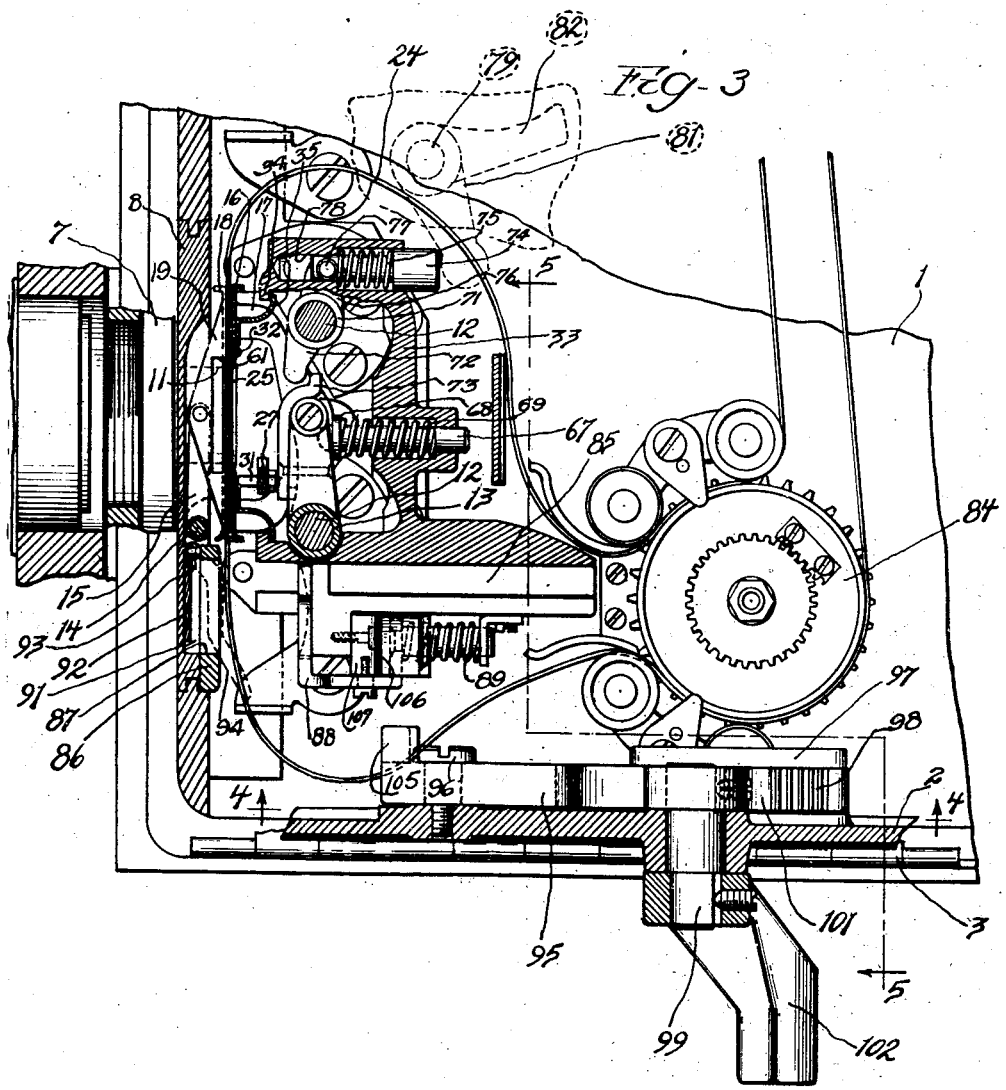

Jan. 8, 1929.
A. S. HOWELL
1,698,333
DIRECT VIEWING PHOTOGRAPHIC CAMERA
Filed Oct. 3, 1924    6 Sheets-Sheet 4
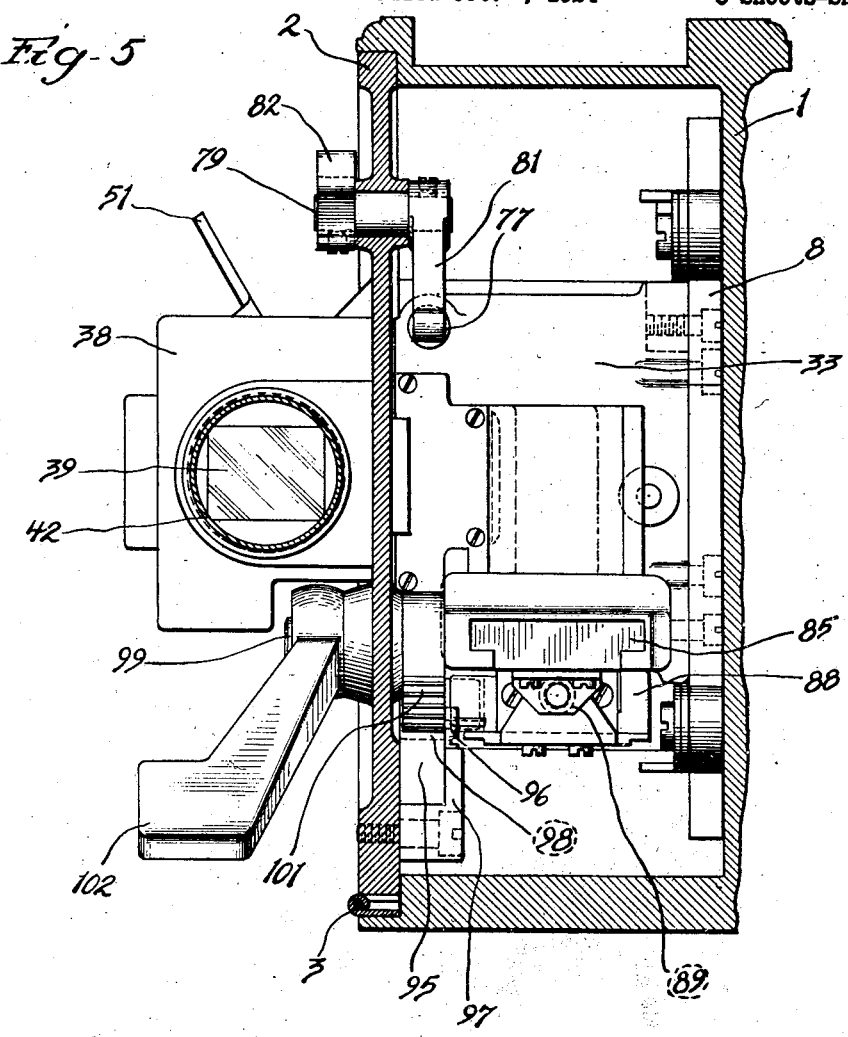
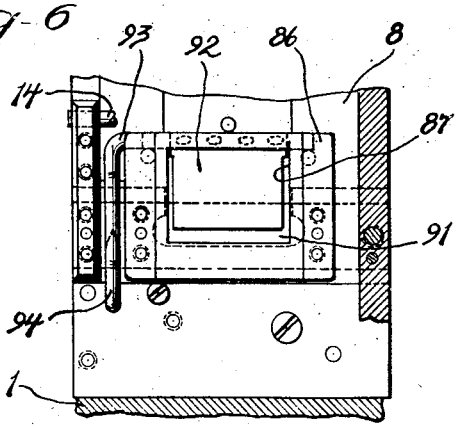
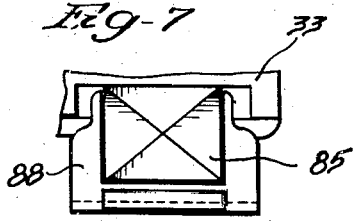
Inventor:-
Albert S. Howell,
By Miehle & Miehle, Attys.

Jan. 8, 1929.
A. S. HOWELL
1,698,333
DIRECT VIEWING PHOTOGRAPHIC CAMERA
Filed Oct. 3, 1924
6 Sheets-Sheet 5
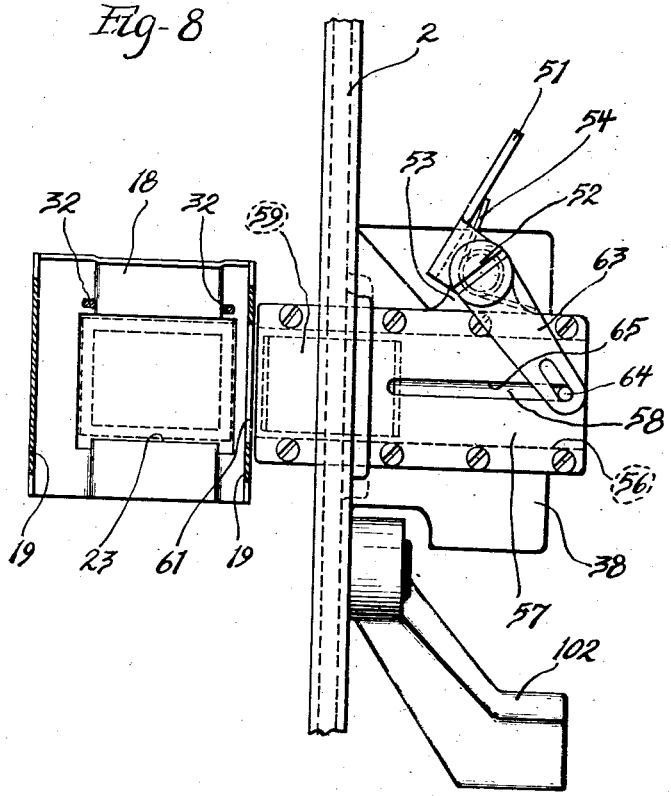
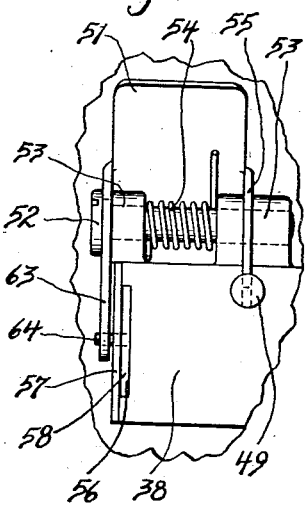
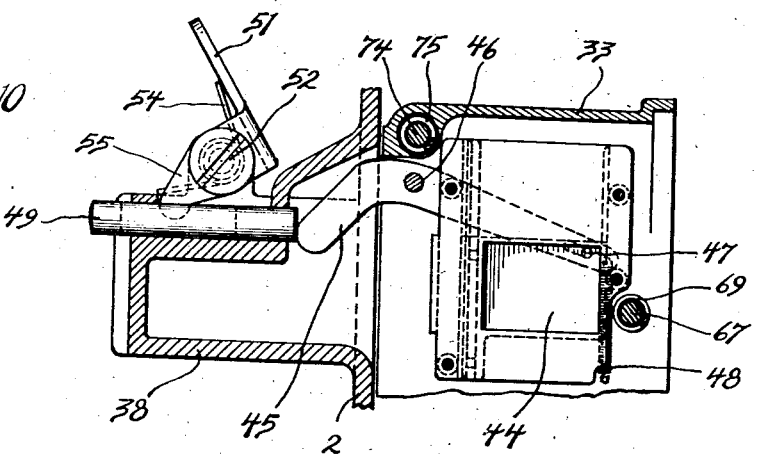
Inventor:—
Albert S. Howell,
By:— Miehle & Miehle, Atty's.

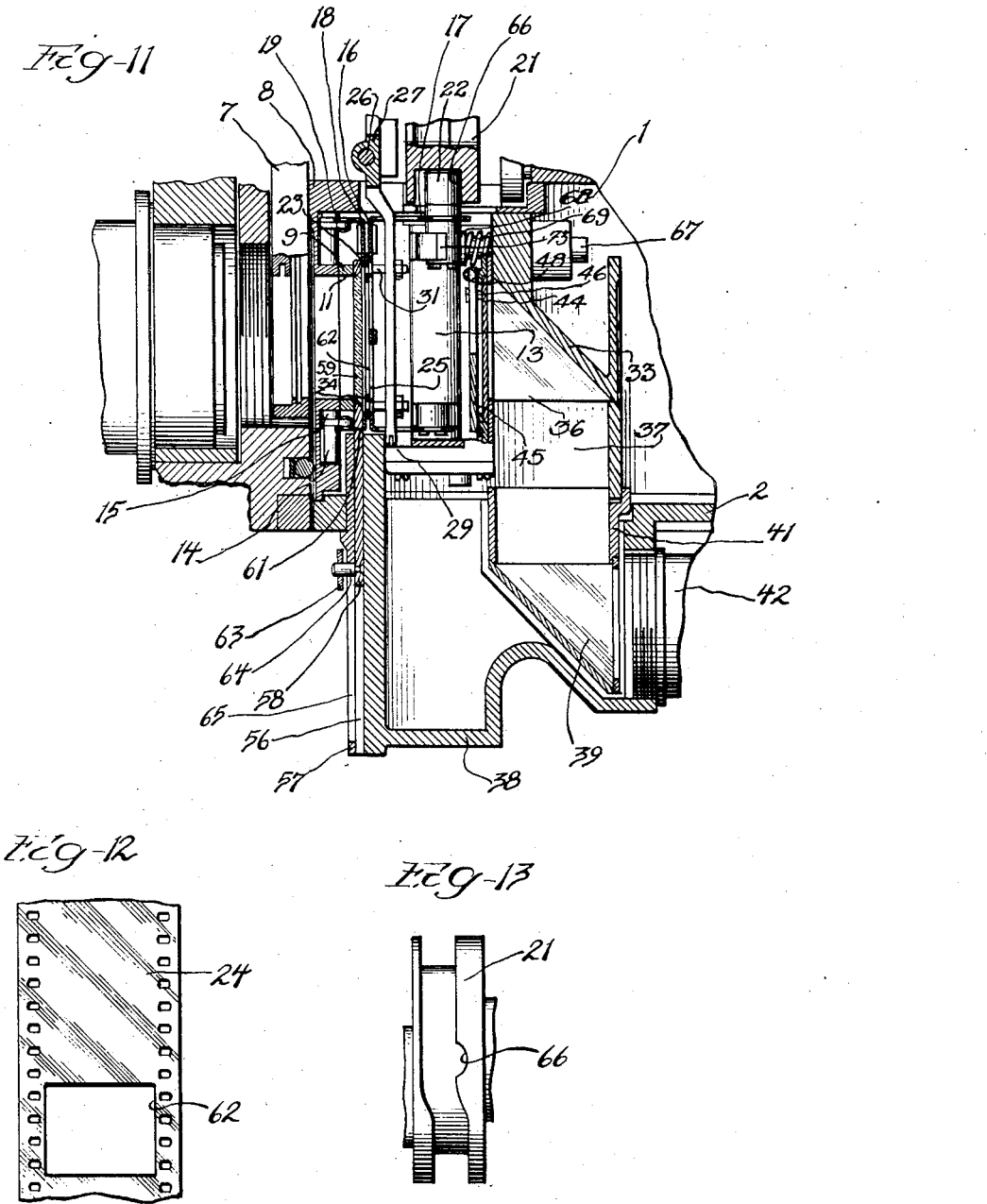

Patented Jan. 8, 1929.

1,698,333

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

DIRECT-VIEWING PHOTOGRAPHIC CAMERA.

Application filed October 3, 1924. Serial No. 741,451.

My invention relates particularly to motion picture cameras although not limited to this use alone.

It is desirable in the use of a photographic camera to view directly the image projected by the photographic lens of the camera upon a translucent image fixing member, such as a ground glass, capable of effecting a relatively brilliant and sharply defined image for purposes of locating the camera and focusing the lens. In cameras in which portions of a sensitized film are successively brought into exposing relation with the photographic lens of the camera for the photographing of a plurality of pictures on the film, it is desirable to effect this direct viewing while the film is in the camera ready for photographing. Heretofore, in cameras of the last mentioned type, such as motion picture cameras, the interference of the film in the camera with the direct viewing of the image projected by the photographic lens has been avoided by effecting relative movement between the photographic lens and the film to position the film out of exposing relation with the lens for the direct viewing of the image projected from the photographic lens upon the image fixing member.

It is the main object of my invention to provide a direct viewing camera in which the direct viewing is accomplished, while the film is in the camera, in a convenient, accurate, and effective manner, and through a translucent image fixing member, such as a ground glass, capable of effecting a relatively brilliant and sharply defined image, and without necessitating undue or inconvenient movement of either the photographic lens or the film in the camera out of its normal position.

Other objects of the invention reside in the construction, arrangement and combination of parts and devices whereby they are well adapted for incorporation in a certain well-known make of motion picture camera without necessitating basic changes in the fundamental design or parts thereof.

With these objects in view my invention consists in certain features of novelty in the construction, combination, and arrangement of parts by which the said features and certain other features, hereinafter appearing, are effected, all as fully described with reference to the accompanying drawings and more particularly pointed out in the claims.

In the said drawings—

Figure 2 is an enlarged partial horizontal section of the same taken on an axial plane of the photographic lens thereof.

Figure 3 is an enlarged partial view of the same in side elevation with the door thereof in open position and with parts broken away and in section.

Figure 4 is a section of the door assembly of the camera taken on the line 4—4 of Fig. 3.

Figure 5 is a sectional view taken on the line 5—5 of Fig. 3, but showing the door of the camera in closed position.

Figure 6 is a partial sectional view looking forwardly from a point immediately to the rear of the die of the punch in the camera, hereinafter described.

Figure 7 is a partial view looking rearwardly from a point immediately in front of the punch member of the punch in the camera, hereinafter described.

Figure 8 is a partial front elevation of the door assembly and of the film guide of the camera in the relative positions they occupy when the door is in closed position.

Figure 9 is a partial exterior view of the door of the camera and parts carried thereon.

Figure 10 is a partial sectional view on the line 10—10 of Fig. 2.

Figure 11 is a view taken similarly with respect to Fig. 2, but showing the parts in different positions.

Figure 12 is a face view of a portion of a film used in the camera.

Figure 13 is a partial side elevation of the intermittent feed cams of the camera.

Like characters of reference indicate like parts in the several views.

Figure 1:
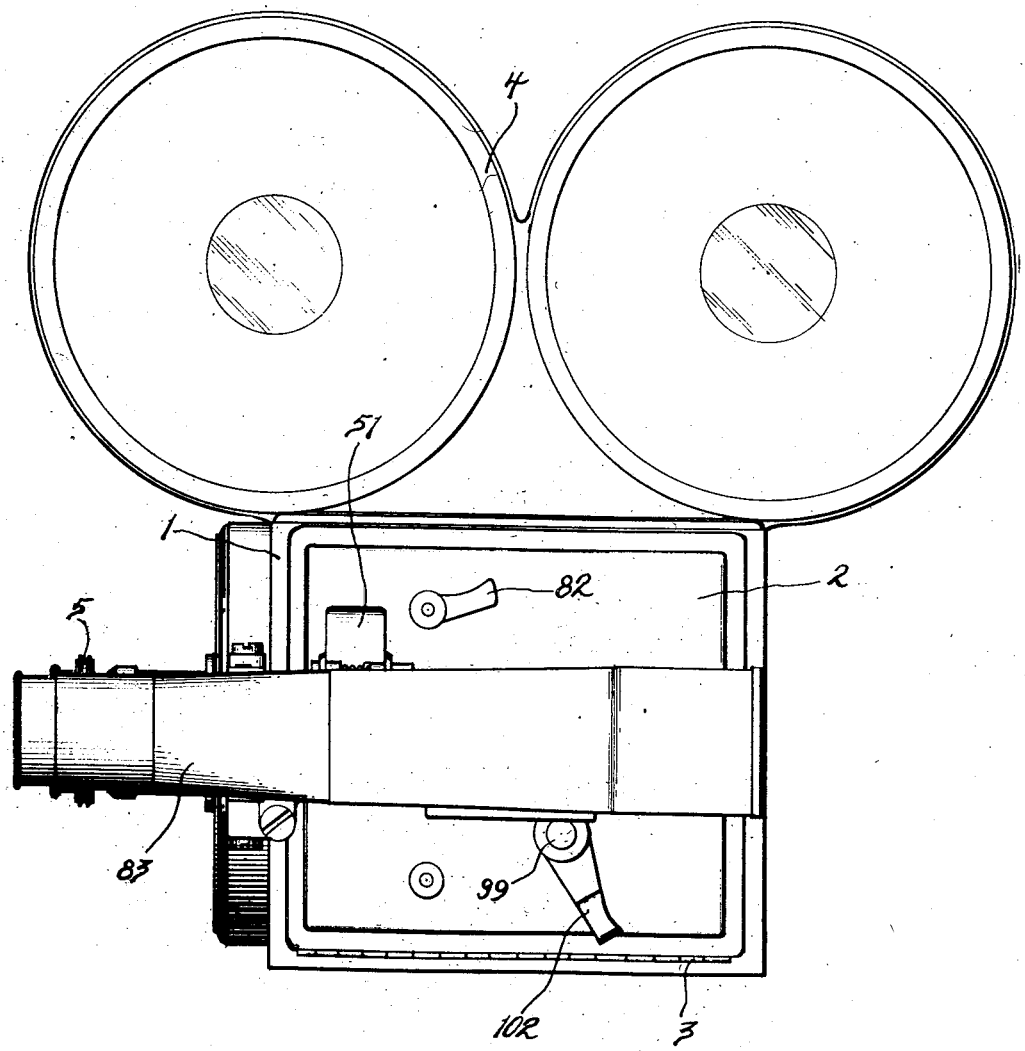
Figure 1 is a side elevation of a motion picture camera embodying my invention.

Referring to the drawings, 1 designates the enclosing casing of the camera, one side of which is formed by a door or cover 2 closing said side of the casing and releasably secured in closed position and hinged at its lower edge as designated at 3 for opening movement to permit access into the camera. Mounted on top of the casing 1 is a film magazine 4 from which the film is fed for exposure in the camera and to which the film is returned after exposure in the camera as is usual. See Fig. 1.

Mounted at the front of the casing 1 is a photographic lens 5, and mounted in the casing and disposed on a horizontal forwardly and rearwardly extending axis spaced to the side of the lens axis opposite that on which the door 2 is disposed is a revoluble member 6. A shutter 7 is secured on the forward end of the member 6 and is disposed in a plane immediately to the rear of the lens and functions to intermittently cut off the light projected from the lens during rotation of the shutter.

The casing 1 forms a film chamber disposed to the rear of the shutter and lens, and the door 2 closes the outer side of the chamber whereby access may be had thereinto. See Figs. 2 and 3. Removably secured at the forward end of the film chamber is a vertically extending angle plate 8, the angle of which is disposed at the inside of the chamber, and one leg of which extends transversely and forms a part of the forward wall of the film chamber at the rear of the shutter and lens. Secured on the rear face of the transverse leg of the angle plate is a rearwardly facing exposure aperture member 9 which is provided with a rectangular exposure aperture 11 registering with the lens. The transverse leg of the angle plate is provided with an aperture registering with the exposure aperture 11, and the light is projected from the lens through these apertures when the shutter is open for exposing a film presented at the rear face of the exposure aperture member, this rear face of the exposure aperture member defining the exposure plane of the film.

An intermittent film feeding mechanism, now to be described, is operated from the revoluble member 6 for presenting successive portions of a film at the face of the exposure aperture member in timed relation with the shutter 7 for exposure to the light projected from the lens.

A pair of vertically spaced horizontal transversely disposed spindles 12 are secured to the inner leg of the angle plate 8 and extend outwardly therefrom some distance to the rear of the exposure aperture 9. These spindles are disposed respectively above and below the horizontal projection of the exposure aperture 11, and pivotally mounted on the lower spindle is a double arm rocker member 13, the arms of which extend upwardly and are disposed on respective sides of the horizontal projection of the exposure aperture 11. A horizontal transversely disposed spindle 14 is secured to the angle plate 8 and is disposed forwardly of the plane of the rear face of the aperture member 9 with its axis disposed in the horizontal plane passing through the axis of the lower spindle 12. Pivotally mounted on this spindle 14 is a double arm rocker member 15, the arms of which extend upwardly and are disposed on respective sides of the aperture member 9. A vertically extending transversely disposed rear film guide member 16 is provided with rearwardly extending flanges 17 at its side edges which are pivotally secured on a common axis to the upper ends of respective arms of the rocker member 13, and a vertically extending transversely disposed front film guide member 18 is provided with forwardly extending flanges 19 at its side edges which are pivotally secured on a common axis to the upper ends of respective arms of the rocker member 15. The film guide members are secured together adjacent the inner vertical sides thereof in adjacent parallelism, for guiding a film therebetween, and so secured together form an intermittent feed film guide adapted for the edgewise insertion and removal of a film at the outer side thereof. The film guide is supported by the rocker members 13 and 15 for forward and rearward movement and the arrangement is such that the film guide is parallel with the rear face of the aperture member 9 in all positions of its movement. The groove of a double acting drum cam 21 on the revoluble member 6 is engaged by a roller 22 carried by the inner arm of the rocker member 13 at the upper end of the arm for positively effecting forward and rearward movement of the film guide during rotation of the member 6. An aperture 23 is formed in the front guide member 18 into which the aperture member 9 projects when the guide is in a forward position, and permits a film 24 in the guide to be pressed against the rear face of the aperture member by the rear guide member 16 when the guide is in its forward position as positioned by the cam 21 for exposure, whereby the rear face of the stationary aperture member 9 defines the exposure plane of the film, the film being exposed while pressed against the aperture member. See Figs. 2, 3, and 8. An aperture 25 substantially coextensive with and registering with the exposure aperture 11 is formed in the rear guide member 16 for purposes hereinafter described.

Mounted for vertical reciprocating movement on a vertical spindle 26 disposed adjacent the member 6 is a shuttle 27, one end of which is bifurcated and embraces a radial cam 28 on the revoluble member 6 for effecting vertical reciprocation of the shuttle during rotation of the member 6. The shuttle 27 extends from the spindle 26 outwardly through openings in the angle plate 8 and the flanges 17 of the rear guide member 16 and transversely of the film guide at the rear thereof, and the extreme outer end of the shuttle is provided with a vertical outwardly facing groove which is slidably engaged by a vertical slide member 29 for pivotally positioning the shuttle for vertical reciprocation. A pair of forwardly projecting feed pins 31 are mounted on the shuttle and are disposed to project through suitable openings in the film guide and engage usual marginal perforations in the film in the guide when the guide is in a rearward position to feed the film vertically in the guide, these pins being engaged with and disengaged from the film respectively with rearward and forward movement of the guide. A pair of rearwardly projecting stationary pilot pins 32 are secured on the transverse leg of the angle plate 8 and are disposed immediately above the exposure aperture 11 and are adapted to project through suitable openings in the film guide and engage the marginal perforations of the film in the guide when the guide is in its forward or exposing position to positively position the film in its rest or exposing position, these stationary pins being engaged with and disengaged from the film respectively with forward and rearward movement of the guide.

The timing of the cams 21 and 28 is such that the film is intermittently fed in the guide during rotation of the member 6, successive picture portions of the film being presented at the rear face of the aperture member 9 for exposure during successive rest periods of the film. The shutter 7 is timed with the cams so that it cuts off the exposing light from the film during the movement of the film and permits exposure of the film during the rest periods thereof as is usual.

Disposed to the rear of the film guide and secured to the inner leg of the angle plate 8 and extending outwardly therefrom and having its outer portion secured with the outer ends of the spindles 12 is a boxlike enclosing casing 33, which is open at the front. See Figs. 2 and 3. The upper and lower edges of the front opening of this casing are provided with overhanging flanges 34 which cooperate in an obvious manner with respective transverse flange pieces 35 secured to the rear film guide member 16 and extending rearwardly therefrom to prevent the passage of light from the enclosure of the casing into the film chamber of the camera at the upper and lower edges of the front opening of this casing and at the same time permit forward and rearward movement of the film guide. See Fig. 3. The adjacency of the inner edge of the film guide with the inner leg of the angle plate 8 prevents the passage of light from the enclosure of this casing into the film chamber at the inner side of the front opening of the casing. See Fig. 2. The door assembly, hereinafter described, when closed prevents the passage of light from the enclosure of this casing into the film chamber at the outer side of the casing. See Fig. 2. Thus the enclosure of the casing 33 is light trapped from the film chamber, so that light from the enclosure of this casing cannot pass into the film chamber and expose the film therein.

The rear wall of the casing 33 has a recess formed therein in which is mounted a glass reflecting prism 36 disposed to reflect the light, projected from the lens 5 through the apertures 11, 23, and 25 laterally in a direction toward the door 2 through an opening 37 in the casing 33. See Fig. 2. The door 2 is provided with an outwardly extending formation 38 forming an inwardly facing enclosure disposed to lie opposite the casing 33 when the door is closed. Disposed in the enclosure of the formation 38 and arranged to reflect the light reflected from the prism 36 in a rearward direction is a second glass reflecting prism 39 which is carried by a mounting 41 secured to the door. Secured in an aperture in the rear wall of the formation 38 is a horizontally forwardly and rearwardly extending viewing tube 42 disposed on the exterior of the door 2 and having its rear end exposed for viewing. The viewing tube 42 and the prism 39 are so arranged that the light reflected from the prism 36 is reflected by the prism 39 rearwardly in the viewing tube, so that the light projected from the photographic lens may be viewed from the rear end of the viewing tube. An optical magnifier 43 of usual construction is preferably mounted in the viewing tube 42 in order to enlarge an image that is reflected into the tube by the prism 39 as hereinafter described.

A shutter 44 is mounted for vertical movement in a usual manner within the casing 33 immediately in front of the prism 36, and when in a lower position obstructs the light path between the film guide and prism 36 to prevent the ingress of light through the prisms and the exposure of the film in the guide thereby. See Figs. 2 and 10. Being disposed between the film guide and prism 36 the shutter 44 when closed also prevents light from the lens being reflected forwardly upon the film in the guide.

A transversely disposed lever 45 extends through an opening in the casing 33 and is pivotally mounted at an intermediate point thereon upon a stud 46 mounted on the casing 33 adjacent the door 2 and disposed on a horizontal forwardly and rearwardly extending axis. See Figs. 2 and 10. The inner end of the lever 45 has a radial slot formed therein which is engaged by a pin 47 secured on the shutter 44 whereby the shutter may be moved out of and into closed position in front of the prism 36 by actuation of the lever. A tension spring 48 within the casing 33, having its respective ends secured to the inner end of the lever 45 and to the casing 33, is adapted to move the shutter into closed position.

The outer end of the lever 45 is formed so that inward pressure thereon will move the shutter 44 upwardly out of closed position to permit the light projected from the lens 5 to pass this shutter for reflection by the prism 36 for viewing through the viewing tube, the spring 48 returning this shutter into closed position when the pressure is released.

The outer end of the lever 45 extends into the enclosure of the formation 38, and a stud 49 disposed for longitudinal movement in a transversely disposed bore in the formation 38 abuts the outer end of the lever 45 with its inner end for exerting inward pressure on the lever to open the shutter 43, this arrangement permitting opening of the door 2. A lever 51 is pivotally mounted on the exterior of the upper wall of the formation 38 by means of a stud 52 disposed on a horizontal forwardly and rearwardly extending axis and mounted in alined bores of spaced upstanding ears 53 on the formation 38. See Figs. 8, 9, and 10. The main portion of the lever 51 extends upwardly and outwardly from the stud 52 for manual actuation downwardly and a torsion spring 54 encircling the stud 52 and engaging the lever 51 and the formation 38 with its respective ends is adapted to move the lever to an upper position and to normally maintain it there. The rear side of the lever 51 is provided with a downwardly extending arm 55 which extends through slots in the formation 38 and stud 49 for engagement with the stud 49 to move it inwardly with manual actuation of the lever 51 against the influence of the spring 54 whereby to open the shutter 44 assuming that the door 2 is in closed position.

The front wall of the formation 38 is disposed in a vertical transverse plane and is extended inwardly from the door to a point adjacent the outer side of the film guide, hereinabove described. See Figs. 2 and 8. A relatively wide transversely extending channel 56 extends across the front face of said front wall of the formation 38, and a plate 57, extending through and closing an opening in the door 2 immediately in front of said front wall of the formation 38, is secured against the front face of said front wall and forms a slide with the channel 56. This channel, disposed at the outer side of the aperture member 9 and the aforementioned film guide, extends therefrom laterally of the path of the film in the guide and is disposed centrally with respect to the exposed aperture 11. Mounted in this slide for transverse movement is an image fixing ground glass member consisting of a metal plate 58, adjacent the inner end of which is formed an aperture substantially coextensive with the exposure aperture 11, and an image fixing translucent ground glass 59 secured in said aperture.

The ground glass member is disposed for movement in a plane immediately to the rear of the plane of the rear face of the aperture member 9, and is movable inwardly from a non-functioning position as shown in Figs. 2 and 8, into a functioning position, as shown in Fig. 11, in which the ground glass member projects inwardly from the slide in which it is mounted across the aperture member 9 at the rear face thereof with the ground glass 59 registered with the exposure aperture 11, assuming of course that the door 2 is in closed position. The positioning of the ground glass member in functioning position takes place when the film guide is in a rear position, the ground glass member in functioning position, being disposed in front of the film guide and film therein or between the aperture member 9 and the film guide. An aperture 61 in the outer flange 19 of the front film guide member 18 permits the movement of the ground glass member into functioning position when the film guide is in a rearward position. When the ground glass member is in sition. When the ground glass member is in functioning position, the ground glass 59 fixes the image projected by the photographic lens 5 through the exposure aperture 11, and the ground surface of the ground glass is disposed forwardly and at the rear surface of the aperture member 9 in order to fix the image in the exposure plane of the film as defined by said rear surface of the aperture member as hereinbefore described. The ground glass member is moved into functioning position while the shuttle 27 is at the lower end of its stroke, so that the ground glass member passes between the stationary pilot pins 32 and the feed pins 31.

When the ground glass member is in functioning position the image projected thereon is viewed through the aforementioned viewing means, while the shutter 44 is open, through the hereinbefore mentioned apertures 23 and 25 in the film guide members 18 and 16 and through an aperture 62 in the picture portion of the film 24 in the guide registered with the exposure aperture 11, this aperture in the film being preferably coextensive with the exposure aperture in order that the entire image may be viewed. See Figs. 11 and 12.

The ground glass member is moved into and out of functioning position from the exterior of the camera and is operated by the lever 51, which operates the shutter 44 as hereinbefore described, by an arm 63 at the front side of this lever extending downwardly in front of the plate 57 and engaging, by means of a radial slot therein, a stud 64 secured on the plate 58 and extending forwardly therefrom through a transversely extending slot 65 in the plate 57. See Figs. 2, 8, and 9. Thus the lever 51 controls both the shutter 44 and the ground glass member, and downward movement of the main portion of the lever 51 effects movement of the ground glass member into functioning position and opening of the shutter 44, and upward movement of this lever under the influence of the spring 54 effects movement of the ground glass member out of functioning position and permits closing of the shutter 44 by the spring 48.

The light shutter 7 is timed as is usual to permit the light to be projected through the exposure aperture only when the cam 21 is positioned in film guide rest or exposure position, that is while the film guide is normally in its forward position with the portion of the film 24 therein in exposing relation with the lens or exposure aperture presented at the rear face of the aperture member 9. In order that the ground glass member may be positioned between the aperture member 9 and the film guide while the light shutter is in exposing position the following means is provided.

The rear wall of the groove of the cam 21 is cut away, as designated at 66, at a point on the forward film guide rest portion thereof which lies opposite the roller 22 when the shuttle 27, operated by the cam 28, is at the lower end of its stroke, into which cut away portion the roller 22 may move to permit rearward movement of the film guide. Thus at a point in the cycle of the camera mechanism where the cam 21 is in forward film guide rest position, where the shuttle 27 is at the lower end of its stroke, and where the light shutter 7 is open, the film guide may be moved rearwardly and the ground glass member moved into functioning position between the aperture member 9 and the film guide.

A forwardly and rearwardly extending rod 67 has its rear end mounted for longitudinal movement in the reduced rear end of a bore in the casing 33 adjacent the inner leg of the angle plate 8. See Figs. 2 and 3. The forward end of this rod is hemispherical and is seated in a corresponding rearwardly facing recess in the inner arm of the rocker member 13 adjacent the upper end of the arm. The rod 67 is provided with a flange 68 adjacent its front end, and a coiled compression spring 69 encircles this rod and abuts this flange and the casing 33 with respective ends to yieldably urge the film guide assembly forwardly. This spring device serves, during normal operation of the camera mechanism, to maintain the film in the film guide presented at the rear surface of the aperture member 9 during the passage of the roller 22 through the forward film guide rest portion of the groove of the cam 21 whereby to prevent rearward movement of the film guide as the cut away portion 66 passes the roller. In addition this spring device exerts forward pressure on the ground glass member when it is in functioning position with obvious advantage by means of the front guide member of the film guide pressing against the ground glass member at the sides of the aperture 23 in this guide member. See Fig. 11.

In Figs. 2 and 3 the camera mechanism is shown as in normal operation, and in Fig. 11 the parts are shown with the ground glass member in functioning position.

The film guide is moved rearwardly for the movement of the ground glass member into functioning position from the exterior of the camera and while the door 2 is closed in the following manner. A rocker member 71 having an elongated tubular hub is pivotally mounted on the upper spindle 12 within the casing 33. The rocker member 71 is provided at its inner end with a downwardly projecting arm 72 which lies in front of an upwardly projecting finger 73 secured on the inner arm of the rocker member 13 and is adapted to engage this finger and move the rocker member 13 rearwardly with pivotal movement of the rocker member 71 to move the arm 72 rearwardly. The casing 33 is provided at the top thereof and adjacent its outer side with a rearwardly facing bore having its rear portion enlarged, and mounted for longitudinal movement in this bore is a plunger 74 enlarged at its rear end to fit in the enlarged portion of said bore. A coiled compression spring 75 encircles the small portion of the plunger 74 and abuts the shoulders of said bore and the plunger with its opposite ends to yieldably urge the plunger rearwardly. The rocker member 71 is provided with an upwardly extending arm 76 at its outer end, and a stud 77 secured on this arm extends into an enlarged bore at the forward end of the plunger 74. The spring 75 normally maintains the plunger 74 in a rearward position, determined by the stud 77 engaging the rear end of a slot 78 through which the stud 77 extends from the interior of the casing 33. Through the connection formed by the stud 77 the spring 75 also normally maintains the rocker member 71 in a position in which the arm 72 is disengaged from the finger 73, as shown in Fig. 3. Forward pressure on the rear end of the plunger 74 acting through the stud 77 and arm 76 causes movement of the arm 72 rearwardly to engage the finger 73 and move the film guide assembly rearwardly. A shaft 79 is journaled on the door 2 and extends therethrough and is disposed to lie above the rear end of the plunger 74 when the door is closed. Secured to this shaft on the inside of the door is a downwardly extending arm 81 having its lower end disposed in back of the plunger 74 when the door is closed. Secured to the shaft 79 on the outside of the door is a rearwardly extending arm 82. See Figs. 1 and 5, and Fig. 3 in which the shaft 79 and arms 81 and 82 are shown by dotted lines in the positions they occupy when the door 2 is closed. When the door 2 is closed downward pressure on the rear end of the lever 82 causes forward movement of the lower end of the lever 81 which abuts the rear end of the plunger 74 and moves the same forwardly to cause pivotal movement of the rocker member 71 to move the film guide assembly rearwardly as hereinbefore described. The arrangement of the lever 81 with respect the plunger 74 permits opening and closing of the door in an obvious manner.

The inwardly projecting portion of the front wall of the formation 38, the prism mounting 41 on the door 2, and the normal portion of the door 2 cooperate with the outer side of the casing 33, to prevent the ingress of light into the film chamber from the viewing means at the outer side of the casing, thus complementing the casing 33 and the means hereinabove described for light trapping the image path through the viewing means from the film chamber, whereby the film in the film chamber is not exposed by reason of the light passing thereinto from the viewing means. The formation and arrangement of the film guide and the aperture memeber 9 serves to prevent the exposure of the film in the camera except perhaps a small portion at the film guide, the exposure of which is negligible as a practical consideration.

Assuming that the film in the camera has the aperture 62 therein registered with the exposure aperture 11, the direct viewing by means of the ground glass member is accomplished, without opening the camera, as follows. The film guide assembly is moved to a rearward position with the roller 22 engaging in the cut away portion 66 of the cam 21, as shown in Fig. 11. This is preferably accomplished by exerting downward pressure on the lever 82 to press the film guide assembly rearwardly, and while maintaining this pressure slowly actuating the camera mechanism, as by the usual operating crank, until the roller 22 moves into the cut away portion 66 of the cam. While maintaining this pressure to hold the film guide assembly in a rearward position the lever 51 is pressed downwardly to move the ground glass member into functioning position between the aperture member 9 and the film guide and to open the shutter 44. While holding the lever 51 in its lower position, the lever 82 is released so that the spring 69 acting through the film guide assembly exerts forward pressure on the ground glass member to maintain it in functioning position against the influence of the spring 54. After this the lever 51 may be released, and the image on the ground glass member viewed in a direction from the rear of the guide and film therein and through the apertures 23 and 25 in the film guide members and through the aperture 62 of the film registered with the exposure aperture 11.

The ground glass member is adapted to afford a clear and brilliant image and the image thereon, and being in the exposure plane of the film as defined by the rear face of the aperture member 9, provides for very accurate focusing of the photographic lens. By reason of the fact that the exposure aperture 11 is utilized in focusing without shifting the same or disturbing its relation with the lens the photographic field may be accurately observed with the result that the camera may be located with great accuracy.

When it is desired to move the ground glass member out of functioning position and to close the shutter 44 downward pressure is exerted upon the rear end of the lever 82 to release the ground glass member, whereupon the spring 54 operates the lever 51 to withdraw the ground glass member out of functioning position and permits the spring 48 to close the shutter 44. After this the camera is ready to take pictures, the portion of the film having the aperture 62 therein feeding through the camera in a usual manner when the camera is operated.

A view finder 83 is detachably mounted at the side of the camera and is adjustable to coordinate the image field thereof with the photographic field of the camera in order that the operator may observe the photographic field while the camera is in operation.

The film itself may be utilized as an image fixing member whose image may be observed through the direct viewing means. The image effected on the film by reason of the density of the film is somewhat obscure and hazy so that it is not to be preferred, particularly in focusing the photographic lens. However, in order that the image effected on the film may be observed, the stud 49 is extended outwardly of the formation 38, so that it can be pushed inwardly to open the shutter 44 for direct viewing without operating the lever 51 to move the ground glass member, the aforementioned slot in the stud 49 permitting inward movement of the stud without actuating the arm 55 of the lever 51. See Figs. 8, 9, and 10.

The direct viewing means is particularly adapted to motion picture cameras in which, as shown, a constant feed means 84, operated with the intermittent film feed mechanism for feeding the film to and from the intermittent feed film guide, is disposed to the rear of the film guide. Where as shown the viewing tube is mounted on the door of the camera the viewing means does not interfere with the design or operation of the camera mechanism nor does it interfere with access into the camera, it being also advantageous particularly from a structural stand point to have the outer prism 39 carried by the door.

In order that apertures 62 may be punched in the film in the camera at any desirable points for direct viewing a punch means is provided, and will now be described.

The extreme lower portion of the casing 33 extends rearwardly to a point adjacent the constant film feeding means 84, and this extended lower portion is formed with a horizontal forwardly and rearwardly extending downwardly facing T-slot in which is mounted for forward and rearward sliding movement a punch member 85. See Figs. 3, 5, and 7. The front portion of the punch member is rectangular in form corresponding with the exposure aperture 11 and is alined with the picture portion of the film in the film guide. A rearwardly facing die 86 is secured to the rear face of the transverse leg of the angle plate 8 below the aperture member 9 and is provided with a rectangular aperture 87 therethrough which corresponds in size with the front portion of the punch member 85 and which is alined therewith for the movement of this front portion of the punch member thereinto with forward movement of the punch member. See Figs. 3 and 6. The punch device including the punch member 85 and the die 86 is disposed at the lower end of the intermittent film feed guide with the die in front of the film engaged in the guide and the punch member spaced rearwardly of the film when positioned for camera operation as shown in Fig. 3, the film passing from the lower end of the guide between the die and punch member to the constant feed means 84. The rear surface of the die 86 is disposed a slight distance in front of the rear surface of the aperture member 9 to avoid scratching of the film during operation of the camera, and in this connection it is to be observed that the film guide and accordingly the film therein is in a rearward position during movement of the film in the guide. The punch member 85 has a clamp member 88 mounted thereon for forward and rearward movement, and the clamp member is normally spring pressed in a forward position by a spring device 89 and has the forward clamping portion thereof extending around the sides and bottom of the forward portion of the punch member. See Figs. 3 and 7. The forward or clamping portion of the clamp member 88 is normally disposed at the front of the punch member as shown, and as the punch member moves forward to the punch the film this clamping portion of the clamp member clamps the film against the rear surface of the die just before the actual punching of the film is initiated. Further forward movement of the punch member causes it to punch an aperture in the film and to enter the aperture 87 of the die carrying the blank punched from the film with it, the spring device 89 permitting the punch member to move forwardly with respect to the clamp member during the actual punching. After the film is punched the punch member is moved rearwardly to its normal rearward position, the spring device 89 maintaining the clamp member clamping the film against the die until the normal relation of the punch and clamp members is assumed after which the clamp member moves rearwardly with the punch member to the rearward position of the punch member as shown. The clamp member serves to strip the film from the punch member in an obvious manner during withdrawal of the punch member from the die so that the film cannot be caught on the punch member.

A recess 91 in the rear face of the transverse wall of the angle plate 8 cooperates with the aperture 87 of the die 86 to form a cavity for receiving and temporarily holding the blanks punched from the film by the punch device, and these blanks are ejected by means of an ejector plate 92 disposed in said cavity and secured to a transverse pivotally mounted rod 93 disposed in a recessed portion of the transverse leg of the angle plate 8 just forwardly of the upper portion of the die 86. The outer end of the rod 93 is bent radially of the pivotal axis thereof and extends at the outer side of the die for manual manipulation, as designated at 94, whereby the rod may be actuated on its pivotal axis to move the ejector plate rearwardly from its normal forward position in the aforementioned cavity to eject the aforementioned blanks rearwardly out of the cavity. See Fig. 6, and Fig. 3 in which the portion 94 of the rod 93 is shown by dotted lines. The aforementioned cavity is deep enough to hold quite a number of blanks so that they may be allowed to accumulate therein until the camera is opened for some other purpose such as the lacing of a film in the camera.

The punch device is so spaced with respect to the exposure aperture 11 that when the film is punched while the camera mechanism is in forward film guide rest position, the aperture so punched will register with the exposure aperture 11 when the camera mechanism is in a forward film guide rest position after operating the camera mechanism a predetermined amount. As shown, after the punching of the film the camera mechanism is operated to move the film upwardly in the guide two picture spaces in order to register the aperture punched in the film with the exposure aperture.

Means is provided whereby the punch device is operated from the exterior of the camera to punch the film and consists of the following. See Figs. 3, 4 and 5. A rack bar 95 is carried on the inner side of the door 2 for longitudinal movement parallel with the path of the punch member 85 by means of a headed stud 96 secured to the door and engaged in a longitudinally extending slot through the rack bar at its front end and a bracket 97 secured to the inner side of the door and forming therewith an upwardly facing rearwardly and forwardly extending slide which is engaged by the rear end of the rack bar. The rear portion of the rack bar is provided with an upwardly facing gear tooth rack 98, and secured on a shaft 99, extending through and journaled in a bore through the door, and disposed on the inner side of the door is a gear member 101 meshing with the rack 98. Secured on the shaft 99 on the outer side of the door is a lever 102 by means of which the rack bar may be manually actuated in an obvious manner from the exterior of the camera when the door is closed. The stud 96 cooperates with the ends of the slot in the rack bar engaged by the stud to limit movement of the rack bar, and a coiled tension spring 103 disposed on the inner side of the door and has its ends engaged with respective studs 104 respectively secured to the rack bar and the door for moving the rack bar to the rear end of its stroke and normally maintaining it there.

The front end of the rack bar 95 is provided with an inwardly extending lug 105, which, when the door 2 is closed, is adapted to engage a slot 106 in an outwardly extending block 107 secured on the punch member 85 whereby the punch member may be actuated to punch the film by operation of the lever 102, the spring 103 withdrawing the punch member upon release of the lever 102.

In punching the film for direct viewing of the image upon the ground glass member the camera mechanism is first positioned in forward film guide rest position which may be determined by means of the lever 82 in a manner hereinbefore described. The lever 102 is then actuated to punch the film and released. The camera mechanism is then actuated to bring the aperture 62 punched in the film into registry with the exposure aperture 11, which may also be determined by the lever 82. Finally the ground glass member is moved into functioning position and the shutter 44 opened as hereinbefore described whereupon the direct view upon the ground glass member may be had as hereinbefore described.

The lug 105 on the rack bar 95 is adapted to disengage from the slot 106 of the member 107 when the door 2 is opened thus permitting the door to be opened and at the same time permitting the mechanism for operating the punch device from the exterior of the camera to be carried by the door where it does not interfere with the camera mechanism and where the lever 102 is conveniently located.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a motion picture camera the combination with a rearwardly facing stationary exposure aperture member and an intermittent feed film guide movable forwardly and rearwardly for presenting a film therein at the rear face of the aperture member for exposure, of means whereby a translucent image fixing member may be actuated from the exterior of the camera to be temporarily positioned at said rear face of the aperture member and in front of the film in the guide while the guide is in a rearward position, and means for viewing from the exterior of the camera and in a direction from the rear of the guide the image on the fixing member through an opening in the film in the guide.

2. In a motion picture camera the combination with a rearwardly facing stationary exposure aperture member and an intermittent feed film guide movable forwardly and rearwardly for presenting a film therein at the rear face of the aperture member for exposure, a translucent image fixing member, a slide disposed at one side of said aperture member and said guide and extending laterally of the path of a film in said guide and carrying said image fixing member for movement into and out of position in front of the guide and film therein and at said rear face of the aperture member while the guide is in a rearward position, means whereby said image fixing member may be actuated from the exterior of the camera, and means for viewing from the exterior of the camera and in a direction from the rear of the guide the image on said image fixing member through apertures in the guide and film therein.

3. In a motion picture camera the combination with a rearwardly facing exposure aperture member and an intermittent film feeding mechanism including a film guide and revoluble cam means for positively moving said guide forwardly and rearwardly during operation of the camera for periodically presenting a film in the guide against the face of said aperture member for exposure, said cam means being formed to permit rearward movement of the guide while the cam means is in a forward guide rest position, of resilient means yieldably urging said guide forwardly, means manually operable from the exterior of the camera for moving the guide rearwardly, means whereby a translucent image fixing member may be actuated from the exterior of the camera to move into and out of position at said rear face of the aperture member and in front of said guide while the guide is in a rearward position, and means for viewing from the exterior of the camera and in a direction from the rear of the guide through an aperture in the film therein the image projected through said aperture upon said image fixing member.

4. In a motion picture camera the combination with a rearwardly facing exposure aperture member and an intermittent film feeding mechanism including a film guide and a revoluble double acting cam for positively moving said guide forwardly and rearwardly for periodically presenting a film at the rear face of said aperture member for exposure, said cam having a part of the forward guide rest portion thereof formed to permit rearward movement of the guide, of resilient means yieldably urging said guide forwardly, means manually actuated from the exterior of the camera for moving the guide rearwardly, an image fixing translucent ground glass member, a slide disposed at one side of said aperture member and said guide and extending laterally of the path of a film in the guide and carrying said image fixing member for movement into and out of position in front of the guide and film therein and at said rear face of the aperture member while the guide is in a rearward position, means manually controlled from the exterior of the camera whereby the ground glass member may be actuated, and means for viewing from the exterior of the camera and in a direction from the rear of the guide through apertures in the guide and film therein the image projected through said aperture upon the ground glass member.

5. In a photographic camera the combination of punch means for forming an aperture in the picture portion of a film in the camera, means for viewing in a direction from the rear the light projected from the photographic lens of the camera through an aperture in the film formed by said punch means, and means whereby a translucent image fixing member may be temporarily positioned to fix the image projected from the lens for the viewing thereof through said viewing means as and for the purpose described.

6. In a photographic camera the combination of a punch device therein for forming an aperture in the picture portion of a film in the camera, means for operating the punch from the exterior of the camera, means for viewing from the exterior of the camera and through an aperture, formed by said punch device, in the portion of a film in exposing relation with the photographic lens of the camera the light projected from the lens, and means whereby a translucent image fixing member may be actuated from the exterior of the camera to move into and out of position to fix in the exposure plane of the film the image projected from the lens for the viewing thereof through said viewing means.

7. In a photographic camera the combination of punch means operable from the exterior of the camera for forming an aperture in the picture portion of a film in the camera, a translucent image fixing member, means manually controlled from the exterior of the camera for actuating the image fixing member into and out of position in front of the portion of the film in exposing relation with the photographic lens of the camera to fix in the exposure plane of the film the image projected from the lens, and means for viewing in a direction from the rear of and through an aperture, formed by said punch means, in said portion of the film the image on said image fixing member.

8. In a motion picture camera the combination with an exposure aperture member and an intermittent film feeding mechanism for presenting successive portions of a film at said aperture member for exposure, of a punch device in the camera for punching in a film engaged in the feeding mechanism an aperture adapted to register with the exposure aperture of said aperture member when the feeding mechanism is in a film rest position, means whereby a translucent image fixing member may be temporarily positioned between said aperture member and the film to fix the image projected through said aperture member in the exposure plane of the film, and means for viewing the image on said image fixing member through an aperture in the film formed by said punch device and registering with the aperture of said aperture member.

9. In a motion picture camera the combination with a rearwardly facing exposure aperture member and an intermittent film feeding mechanism for presenting successive portions of a film at the face of said aperture member for exposure and including a film guide movable forwardly and rearwardly, of a punch in the camera and disposed at one end of the guide and including a rearwardly facing die disposed in front of the film engaged in the guide for punching in the film an aperture adapted to register with the aperture of said aperture member, means whereby a translucent image fixing member may be moved into and out of position in front of the guide and film therein and at said face of the aperture member while the guide is in a rearward position for fixing in the exposure plane of the film the image projected through the aperture of said aperture member and including a laterally extending slide at one side of the aperture member and guide and carrying said image fixing member, and means for viewing the image on the fixing member in a direction from the rear of the guide through an aperture in the film formed by said punch and registering with the aperture of said aperture member.

10. In a motion picture camera the combination with a rearwardly facing stationary exposure aperture member and an intermittent film feeding mechanism for presenting successive portions of a film at the face of said aperture member for exposure and including a film guide movable forwardly and rearwardly, of a punch device in the camera and disposed at one end of the guide and including a stationary rearwardly facing die disposed in front of the film engaged in the guide for punching in the film an aperture substantially coextensive with the aperture of said aperture member and adapted to register with said aperture of the aperture member while the feeding mechanism is in film rest position, means for operating the punch device from the exterior of the camera, an image fixing ground glass member, a slide disposed at one side of said aperture member and said guide and extending laterally of the path of the film in the guide and carrying said ground glass member for movement into and out of position in front of the guide and film therein and at said face of the aperture member while the guide is in a rearward position, means controlled from the exterior of the camera for actuating said ground glass member into and out of said position, and means for viewing from the exterior of the camera the image on the ground glass member in a direction from the rear of the guide through an aperture therein and through an aperture in the film formed by said punch device and registering with the aperture of said aperture member.

11. In a motion picture camera the combination with a rearwardly facing exposure aperture member and an intermittent film feeding machanism including a film guide and revoluble cam means for positively moving said guide forwardly and rearwardly during operation of the camera for periodically presenting a film in the guide at the face of said aperture member for exposure, said cam means being formed to permit rearward movement of the guide while cam means is in a forward guide rest position, of resilient means yieldably urging said guide forwardly, means manually operable from the exterior of the camera for moving the guide rearwardly, of a punch device in the camera and disposed at one end of the guide and including a stationary rearwardly facing die disposed in front of the film engaged in the guide for punching in the film an aperture substantially coextensive with the aperture of said aperture member and adapted to register with said aperture of the aperture member while the feeding mechanism is in a forward guide rest position, means for operating the punch device from the exterior of the camera, an image fixing ground glass member, a slide disposed at one side of said aperture member and said guide and extending laterally of the path of the film in the guide and carrying said ground glass member for movement into and out of position in front of the guide and film therein and at said face of the aperture member while the guide is in a rearward position, means operable from the exterior of the camera for actuating said ground glass member into and out of said position, and means for viewing from the exterior of the camera the image on the ground glass member in a direction from the rear of the guide through an aperture therein and through an aperture in the film formed by said punch device and registering with the aperture of said aperture member.

12. In a photographic camera the combination with a door thereof permitting access into the camera, of means associated with the door for viewing from the exterior of the camera and while the door is closed the light projected from the photographic lens of the camera through an aperture in a film in the camera and adapted to permit opening of the door, and means also associated with the door whereby a translucent image fixing member may, while the door is closed, be actuated from the exterior of the camera to be temporarily positioned to fix the image projected from the lens for the viewing thereof through said viewing means and adapted to permit opening of the door.

13. In a photographic camera the combination with a side door thereof permitting access into the camera, of means associated with the door for viewing from the exterior of the camera the light projected from the photographic lens of the camera in a direction from the rear and through an aperture in a film in the camera and adapted to permit opening of the door and including a viewing tube on the exterior of the door, a translucent image fixing member mounted on the door for actuation from the exterior of the door into and out of position to fix the image projected by the lens in the exposure plane of the film for the viewing thereof through said viewing means and adapted when out of said position to permit opening of the door.

14. In a photographic camera the combination with a side door thereof permitting access into the camera, of means associated with the door for viewing from the exterior of the camera the light projected from the photographic lens of the camera in a direction from the rear and through an aperture in a film in the camera and adapted to permit opening of the door and including a forwardly and rearwardly extending viewing tube on the exterior of the door and having its rear end exposed for viewing, a translucent image fixing member, and a laterally extending slide on the door carrying said image fixing member for actuation from the exterior of the door into and out of position to fix the image projected by the lens in the exposure plane of the film when the door is closed, said slide and image fixing member being adapted when the image fixing member is out of said position to permit opening of the door.

15. In a photographic camera the combination with a side door thereof permitting access into the camera, of means associated with the door for viewing from the exterior of the camera the light projected from the photographic lens of the camera in a direction from the rear and through an aperture in a film in the camera and adapted to permit opening of the door, means for light trapping the light path through said viewing means from the interior of the camera and adapted to permit opening of the door and including a stationary casing in the camera, a shutter in said casing and movable into and out of position to prevent the ingress of light through said viewing means, a translucent image fixing member mounted on the door for actuation from the exterior of the door into and out of position to fix the image projected by the lens in the exposure plane of the film for the viewing thereof through said viewing means and adapted when out of said position to permit opening of the door, and means for controlling said shutter from the exterior of the door and adapted to permit opening of the door.

16. In a photographic camera the combination with a side door thereof permitting access into the camera, of means associated with the door for viewing from the exterior of the camera the light projected from the photographic lens of the camera in a direction from the rear and through an aperture in a film in the camera, means for light trapping the light path through said viewing means and adapted to permit opening of the door and including a stationary casing in the camera, a shutter in said casing yieldably urged into position to prevent the ingress of light through said viewing means, means including an actuating member mounted on the door for actuating the shutter into open position and adapted to permit opening of the door, a laterally extending slide on the door, a translucent image fixing member mounted in the slide for movement into and out of position to fix the image projected by the lens in the exposure plane of the film, said slide and said image fixing member when out of said position being adapted to permit opening of the door, and means on the door for controlling said image fixing member and said shutter together and adapted when actuated to move the image fixing member into said position to actuate said shutter actuating member to open the shutter and to permit the shutter to close when the image fixing member is moved out of said position.

17. In a direct viewing protographic camera the combination with a side door thereof permitting access into the camera, of a viewing tube on the exterior of the door and having an end exposed for viewing, a reflecting member disposed in the camera to the rear of the exposure aperture of the camera for reflecting an image, projected through the exposure aperture upon a translucent image fixing member at said exposure aperture, laterally in a direction toward the tube, a second reflecting member carried by the door for reflecting the image from the first mentioned reflecting member through said tube for the viewing of the image from said end of the tube, means whereby the image path from said image fixing member to said tube is light trapped from the interior of the camera and adapted to permit opening of said door, shutter means operable into and out of closed position to obstruct the image path to prevent the ingress of light, and means whereby said shutter means is operable from the exterior of the camera.

18. In a direct viewing photographic camera the combination with a side door thereof permitting access into the camera, of a rearwardly and forwardly extending viewing tube on the door and having its rear end exposed for viewing, a reflecting member disposed in the camera to the rear of the exposure aperture of the camera for reflecting an image, projected through the exposure aperture upon a translucent image fixing member at said exposure aperture, laterally toward the tube, a second reflecting member carried by the door for reflecting the image from the first mentioned reflecting member rearwardly in said tube for the viewing of the image from the rear of the tube, means whereby the image path is light trapped from the interior of the camera and adapted to permit opening of the door, a shutter operable into and out of closed position to obstruct the image path to prevent the ingress of light, and means whereby said shutter is manually operable from the exterior of the camera.

19. In a direct viewing photographic camera the combination with a side door thereof permitting access into the camera, of a rearwardly and forwardly extending viewing tube on the exterior of the door and having its rear end exposed for viewing, a glass reflecting prism disposed in the camera to the rear of the exposure aperture of the camera for reflecting an image, projected through the exposure aperture upon a translucent image fixing member at said exposure aperture, laterally toward the tube, a second glass reflecting prism carried by the door for reflecting the image from the first mentioned prism rearwardly in said tube, an optical magnifier associated with said tube for magnifying the image for the viewing thereof from the rear of the tube, means whereby the image path is light trapped from the interior of the camera and adapted to permit opening of the door and including a stationary enclosing casing in the camera and carrying said first mentioned prism, a shutter mounted within said casing for movement into and out of position in front of said first mentioned prism to prevent the ingress of light through the prisms, a lever pivotally carried on the exterior of the door, and means whereby the movement of said shutter is controlled by said lever including means permitting opening of the door.

20. In a direct viewing photographic camera the combination with a side door thereof permitting access into the camera, of a punch in the camera for punching openings in a film in the camera, and operating means carried by the door and adapted for actuation from the exterior of the camera and including a member adapted for engagement to operate the punch when the door is in closed position and disengagement when the door is opened.

21. In a direct viewing photographic camera the combination with a side door thereof permitting access into the camera, of a punch in the camera for punching apertures in the picture portion of a film in the camera and including a punch member reciprocable in a path parallel with the plane of the door, an operating member carried by the door for movement parallel with that of the punch member when the door is closed, interlock formations on the punch member and operating member adapted to engage when the door is closed for actuation of the punch member with movement of the operating member and disengageable with opening of the door, and means pivotally mounted on the door for actuating said operating member including a lever on the exterior of the door.

22. In a direct viewing photographic camera the combination with a hinged side door thereof permitting access into the camera, of a punch in the camera for punching apertures in the picture portion of a film in the camera and including a punch member reciprocable in a forwardly and rearwardly extending direction, a rack bar carried on the inside of the door for longitudinal movement parallel with the path of the punch, interlock formations on the punch member and rack bar adapted to engage when the door is closed for actuation of the punch member by the rack bar and adapted to disengage when the door is opened, a gear member carried on the inside of the door and meshing with the rack bar for operating the same, and a lever carried on the outside of the door for actuating the gear member.

In witness whereof I hereunto affix my signature this 30th day of September, 1924.

ALBERT S. HOWELL.